ADJUSTABLE RACK OR MOUNT FOR SUPPORTING GLASS OR METAL TELEVISION PICTURE TUBES

Filed Dec. 10, 1952 2 Sheets-Sheet 1

INVENTOR.
Glen N. Capps
BY
Glascock Downing & Seebold
Attorneys.

INVENTOR.
Glen N. Capps
BY
Glascock Downing Seebold
Attorneys.

United States Patent Office
2,742,635
Patented Apr. 17, 1956

2,742,635

ADJUSTABLE RACK OR MOUNT FOR SUPPORTING GLASS OR METAL TELEVISION PICTURE TUBES

Glen Nuteon Capps, Hampton, Va.

Application December 10, 1952, Serial No. 325,127

9 Claims. (Cl. 340—367)

The present invention relates to a supporting means for cathode ray tubes.

More particularly this invention relates to an adjustable rack or mount for supporting glass or metal television picture tubes.

The present invention is distinguished from those cathode ray tube mountings that are embodied as a component part of television sets since the invention has particular reference to a rack or mount that is to be utilized in connection with servicing and repair of television sets.

Since present day television sets for the most part are manufactured with two major components, that is, the chassis and the picture tube, it generally happens that when a television set needs repair both of these major components are not in disrepair simultaneously.

Under these considerations where the repair man cannot accomplish the repair or correct the defect in the television set in the owner's home, it is necessary to remove the chassis from the cabinet and take the same to the repair shop. In most instances it is also necessary that in repairing the chassis the picture tube corresponding to the particular size set be connected with the chassis being repaired so that the service man can be sure that the set is functioning properly. In some instances the repair man will remove the tube and chassis from the home of the owner of the damaged television set and in other instances he will remove merely the chasis and utilize a tube corresponding to the one pertaining to the particular set that he may happen to have in stock in his repair shop.

In either instance it is necessary that in repairing the chassis the tube be supported on the repair bench. Some service practices are such as to merely prop up these tubes and since a propped up tube might roll off the props and if it is in circuit with the set it is of course receiving high voltage ranging from 12,000 to 20,000 volts there is the possibility of a fatal accident to the repair man.

Therefore an object of the present invention is to provide an adjustable rack or mount for supporting either glass or metal television picture tubes that is economical to construct and very simple to operate.

It is additionally a specific object to provide in such a rack or mount means permitting proper triangulated support of a television tube regardless of its size, that is, the picture face dimensions, or shape, that is, whether it be round or square, and regardless of whether it is a glass or metal tube.

It is a specific object to provide a television rack or mount including a base, diverging supports arranged on the base and inclined downwardly from one end thereof toward the other, and a vertically adjustable yoke carried by the base at the end thereof adjacent the apex of the diverging arms in combination with hold-down means longitudinally movable of the base to clamp the large end of the television tube regardless of the overall length thereof and further securing and clamping means associated with the vertically adjustable yoke.

It is a specific object to provide in the assembly aforementioned flexible hold-down straps and insulating material linings at least partially on the yoke and along the upper surfaces of the diverging arms.

Further and more specific objects will be apparent from the accompanying drawings in which.

Figures 1, 2, 3, 4:
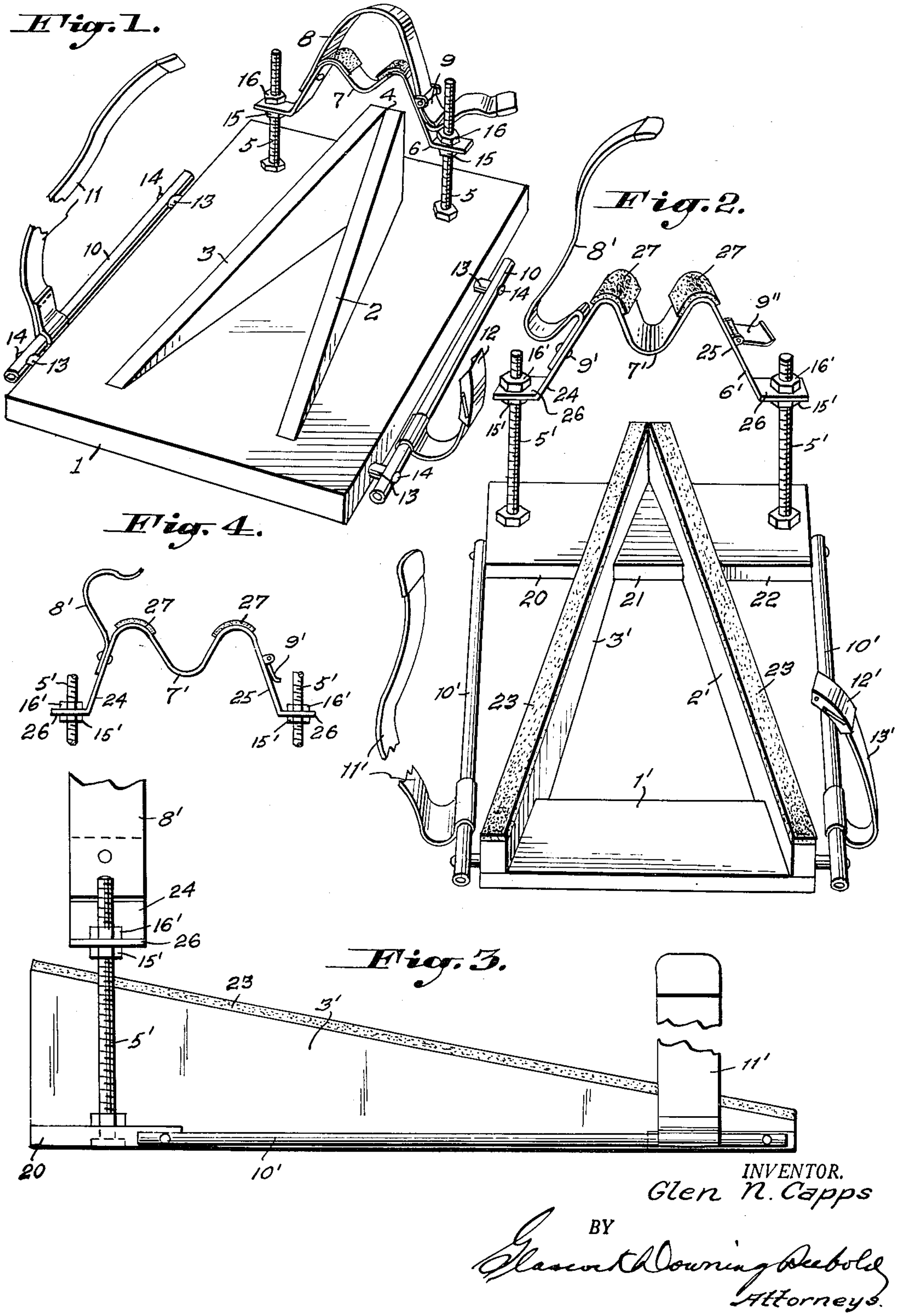
Figure 1 is a perspective view illustrating one form of the invention.
Figure 2 is a perspective view of a slightly modified form of invention.
Figure 3 is a side view of the arrangement shown in Figure 2.
Figure 4 is an enlarged elevational view of the vertically adjustable yoke rest.

As shown in Figure 1, the adjustable mount or rack in accordance with the invention includes a base plate 1 which is approximately twenty-four inches in length and twelve to fifteen inches in width. Mounted on this base are diverging arms 2 and 3. These arms come together at an apex 4 and are inclined downwardly toward their outer ends. The arms or diverging support members are inclined from a height of approximately four inches at the apex until they substantially merge into the upper face of the base plate 1. Projecting upwardly from the base plate 1 adjacent the higher or rear end of the diverging arms are spaced threaded bolts 5. Mounted on these bolts is a yoke rest or support 6 which, as indicated, includes a V-shaped coil receiving surface 7.

Figure 5:
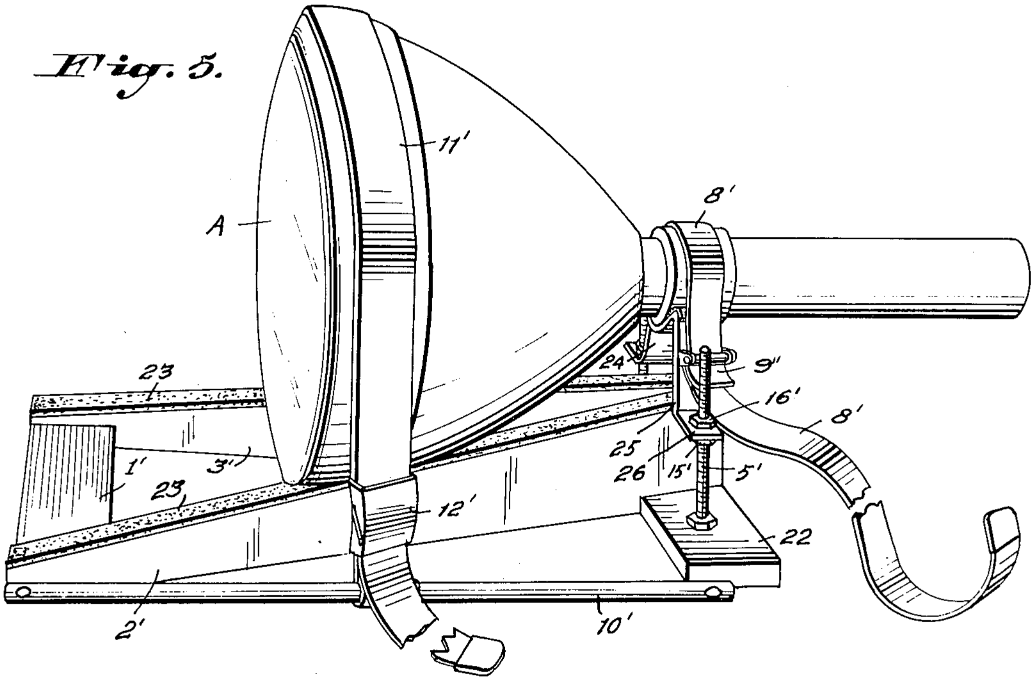
Figures 5 and 6 illustrate the invention in perspective and respectively supporting different size and shaped tubes.
Figure 6:
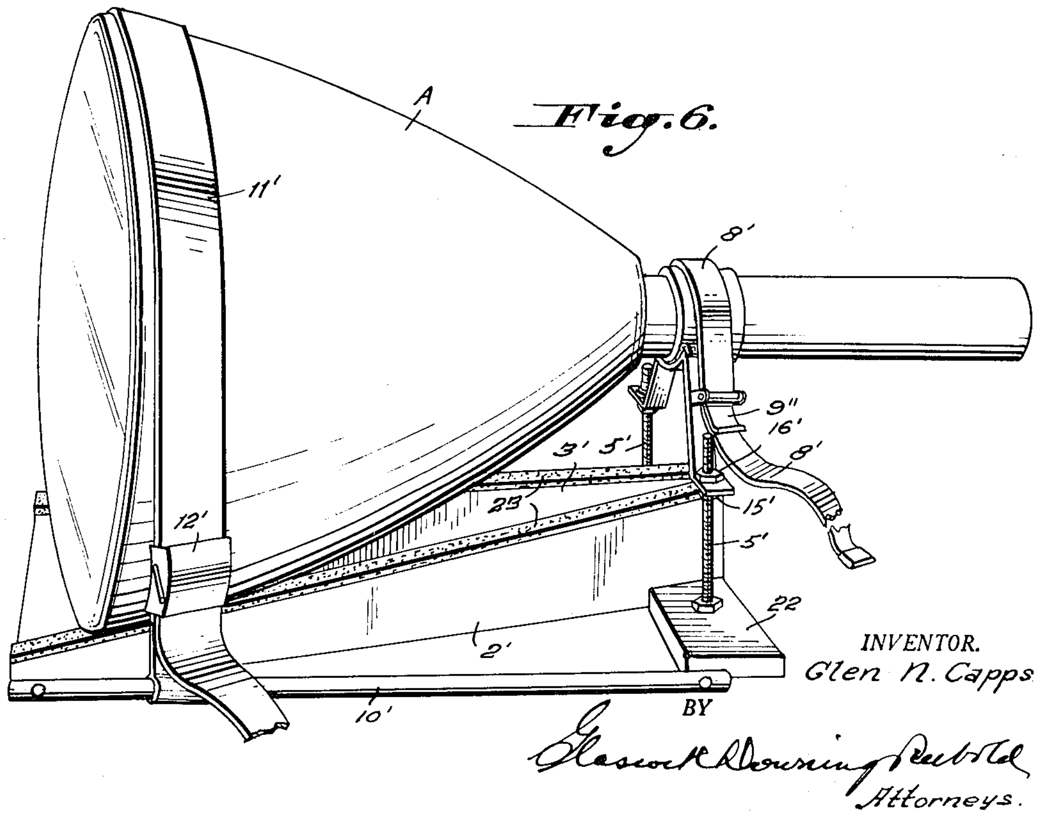

A flexible strap 8 is secured to this yoke rest on one side of the V-shaped support section and a suitable buckle or clamp denoted at 9 is mounted to the opposite side of the yoke rest so that, with one of the coils mounted on the neck of a television tube adjacent the junction of the neck with the base of the tube supported on this V-shaped section 7, the flexible strap 8 can be tightened to securely clamp the rear or neck end of the tube in position with the front or enlarged end of the tube supported by the upper surface of the V-shaped arms 2 and 3, as indicated in Figures 5 and 6.

Running lengthwise along the lateral edges of the board 1 are tube members 10, one of which receives a strap or belt 11 and the other of which receives a buckle 12. Both the strap and the buckle sections of the belt can be moved longitudinally of these tubes. This relationship is clearly shown in Figures 5 and 6. As indicated in the drawings, the tubes are spaced from the side edges of the base plate 1 by spacer members 13 and suitable screws or bolts 14 secure the tubes to the spacer members and to the baseboard. The yoke rest 6 has its under surface contacting nuts 15 vertically movable along the threaded bars 5 and further nuts 16 bear against the top surface of the arms of the yoke rest to permit the proper vertical adjusting movement thereof.

It is therefore seen that the basic components of the present invention include diverging arms having upper surfaces inclined from the apex downwardly to the outer ends thereof, a vertically adjustable yoke rest mounted for vertical movement above the arms adjacent the apex thereof, and longitudinally movable securing means positioned to the side of the arms to secure a large end of the television tube in supported relation on the arms and further securing means embodied with the yoke rest and vertically movable therewith to secure the neck end of the tube in fixed relation on the yoke rest.

A modified arrangement is shown in Figure 2 in which the baseboard as such is eliminated and the diverging arms 2', 3' are connected at their outer ends to a cross-piece 1' and a built-up cross member consisting of sections 20, 21 and 22 extends transversely of the arms adjacent the apex. The vertically extending threaded bars or bolts 5′ and the yoke rest 6′ embody the same structure as in Figure 1. The tube members 10′ are mounted on spacers secured at the side edges of the outer ends of the respective arms 2′, 3′ and on the outer surfaces of the crosspiece sections 20 and 22. The strap 11′ as shown, is looped around one of the tubes 10′ and the buckle 12′ is provided with a strap section 13′ which in turn is looped around the other bar 10′. It thus follows that the respective strap and buckle can be moved longitudinally of the bars 10′. The belt section 8′ is riveted as at 9′ to the yoke rest or support 6′, while another buckle 9″ is mounted to the opposite leg of the yoke rest.

This form of the invention is better illustrated in Figures 5 and 6 which show in Figure 5 a twelve and one-half inch round picture tube A supported by the rack with the strap 8′ and yoke rest 6′ associated with the coil surrounding the narrow neck of the tube adjacent the juncture of the neck with the base of the tube. In Figure 6 a seventeen inch rectangular tube is mounted on the rack and as clearly shown in this view the vertically adjustable yoke rest 7′ has been raised along the threaded rods 5′ while the flexible strap 11′ has been moved longitudinally of the tube 10′ toward the outer ends of the diverging arms 2′, 3′. In both instances it is to be noted that the television picture tube is firmly supported both at its forward end and at its rear end.

With particular reference to Figure 3, the bars or bolts 5′ are approximately eight to twelve inches long and are counter-sunk in the under surface of the respective cross frame members 20, 22. The yoke rest 6′ is vertically adjustable along the threaded section of these bolts by manipulation of the nuts 15′, 16. Rubber stripping at 23 is applied to the upper surface of each of the arms 2′, 3′. As far as the overall dimensions of this form are concerned, the distance between the rear end or apex of the diverging arms and the outer free ends of these arms is approximatly twenty-one inches. The arms are approximately nine inches apart and the arms at their highest vertical dimensions are approximately four and one-half inches from the supporting surface or work bench to which of course is added the one-fourth inch thickness of the rubber strip. At the outer ends of the arms they are approximately three-fourths inch off the supporting surface.

The yoke rest, which is indicated specifically illustrated in Figure 4, is of light metal that is bent to include the central V-shaped yoke receiving section 7′, and the inclined leg sections 24 and 25 and terminal outwardly extending apertured sections 26 which are passed over the vertical bolts 5′. One-eighth of an inch thick rubber stripping 27 is applied to the tops of the sections 24 and 25 and extends down into the V formed by the central section 7′. The rubber stripping on the yoke rest and on the upper surface of arms or support legs 2′, 3′ are for cushioning the support of the tube and for insulating purposes. Figure 4 illustrates rivets 28 securing the belt section 8′ and the buckle section 9′ to the outer surfaces of the leg portions 24, 25.

It is thus clear that I have provided an adjustable rack or mount for television picture tubes which incorporates vertically adjustable supporting means and downwardly inclined outwardly diverging arms extending away from the vertically adjustable supporting means in combination with longitudinally movable hold-down straps mounted laterally of the arms for clamping the large end of a television picture tube to the arm and strap means associated with the vertically adjustable yoke rest for clamping the neck end of the tube to the yoke rest in a vertically adjustable position depending upon the size and shape characteristics of the large end of the tube. Thus my rack will mount the tube in a firm manner with its face generally perpendicular to the work bench so that proper adjustment of the tube and the chassis during repair of the latter can be made with the repair man assured that the picture tube is properly supported as far as safety purposes are concerned and he can get the proper orientation of the picture as it appears on the face of the tube since for all intents and purposes the tube will be mounted as rigidly and as firmly as it would be when installed in the television set and cabinet.

Having now described my invention, what I desire to secure by Letters Patent of the United States, is:

1. An adjustable mount for supporting cathode ray tubes, particularly television picture tubes of any size and external face contour and which tubes include a large end and a narrow neck end comprising the combination of spaced downwardly inclined supporting arms arranged in diverging relationship for receiving the large end of a tube, longitudinally adjustable and releasable securing means for firmly securing the large end of the tube to the arms, depending upon the longitudinal position the large end of the tube assumes on the arms in accordance with its size or shape, vertically adjustable tube neck receiving means mounted adjacent the apex of the arms for receiving the neck end of the tube at such a vertical height in dependence on the size thereof as to support the tube neck in a horizontal position, and securing means associated with the neck receiving means for firmly securing the neck end of the tube thereto.

2. An adjustable mount as claimed in claim 1, in which the arms and the neck end receiving means are faced with a layer of cushioning and insulating material.

3. An adjustable mount as claimed in claim 1 in which the longitudinally adjustable and releasable securing means includes flexible means for passing about the large end of the tube.

4. An adjustable mount as claimed in claim 3 in which the flexible means comprises a strap longitudinally movable alongside one of said arms and a buckle longitudinally movable alongside the other arm.

5. An adjustable mount as claimed in claim 4 and longitudinally extending members mounted in spaced relation to one another and respectively adjacent one of said arms and said strap and buckle being secured to said members and mounted for longitudinal movement relative thereto.

6. An adjustable rack or mount for supporting glass and metal television picture tubes of any size or external face contour and which tubes include a large face end and a narrow neck end, said mount comprising diverging arms having upper surfaces inclined from the apex downwardly to the outer ends thereof, a vertically adjustable yoke rest mounted for vertical movement above the arms adjacent the apex thereof, longitudinally movable securing means positioned alongside each arm for securing the large end of a television tube in supported relation on the arms, and further securing means embodied with the yoke rest and vertically movable therewith to secure the neck end of the tube in fixed relation on the yoke rest.

7. An adjustable rack or mount as defined in and by claim 6, and further including a base frame supporting the arms, the vertically adjustable yoke rest comprising a rigid strap member having a central section and opposite end sections, said central section being V-shaped in cross-section and the opposite end sections having apertures therein, vertically adjustable supporting means secured to the base frame and mounted on opposite sides of the arms adjacent the apex, and means associated with the supporting means for cooperation with the opposite end sections of the yoke rest when the apertures therein are associated with the supporting means to lock the yoke rest in a selected vertically adjusted position to maintain the neck of a supported television tube in horizontal relationship, said further securing means embodied with the yoke rest being fastened thereto between the central section and the respective end sections, the longitudinally movable securing means constituting flexible members and longitudinal members slidably receiving said flexible members and spaced from and extending along the opposite sides of the base frame.

8. An adjustable rack or mount as defined in and by claim 7 in which the upper surfaces of the arms and at least a portion of the upper surfaces of the central section of the yoke rest is provided with a facing of cushioning and insulating material.

9. An adjustable rack or mount as defined in and by claim 8 in which said insulating material is constituted by rubber strips.

References Cited in the file of this patent

UNITED STATES PATENTS

| | | |
|---|---|---|
| 668,695 | Stevens | Feb. 26, 1901 |
| 1,176,157 | Madigan | Mar. 21, 1916 |
| 2,451,832 | Keim | Oct. 19, 1948 |
| 2,484,345 | Hinz | Oct. 11, 1949 |
| 2,505,736 | Herscher et al. | Apr. 25, 1950 |
| 2,586,716 | Ried | Feb. 19, 1952 |